US007867634B2

(12) United States Patent
Chu et al.

(10) Patent No.: US 7,867,634 B2
(45) Date of Patent: Jan. 11, 2011

(54) ITO LAYER STRUCTURE

(75) Inventors: Jau-Jier Chu, Hsin-Chu (TW); I-Wen Lee, Hsin-Chu (TW); Shih-Liang Chou, Hsin-Chu (TW); Po-Yao Lai, Hsin-Chu (TW); Chien-Min Weng, Hsin-Chu (TW)

(73) Assignee: Applied Vacuum Coating Technologies Co., Ltd., Hsin-Chu (TW)

( * ) Notice: Subject to any disclaimer, the term of this patent is extended or adjusted under 35 U.S.C. 154(b) by 0 days.

(21) Appl. No.: 12/000,193

(22) Filed: Dec. 10, 2007

(65) Prior Publication Data

US 2010/0215931 A1 Aug. 26, 2010

(51) Int. Cl.
*B32B 9/00* (2006.01)

(52) U.S. Cl. .................. 428/699; 428/689; 428/697; 428/701; 428/702

(58) Field of Classification Search ................. 428/428, 428/432, 689, 697, 699, 701, 702
See application file for complete search history.

(56) References Cited

U.S. PATENT DOCUMENTS

| 6,787,240 B2 * | 9/2004 | Getz ........................ 428/428 |
| 2007/0259190 A1 * | 11/2007 | Chu et al. ................. 428/432 |

* cited by examiner

*Primary Examiner*—Gwendolyn Blackwell
(74) *Attorney, Agent, or Firm*—Jackson IPG PLLC; Demian K. Jackson

(57) ABSTRACT

A ITO layer structure, which is composed of the ITO as the outermost layer and the first anti-reflected layer on the specific side of the transparent substrate, furthermore, the second anti-reflected layer is formed on the opposite side of substrate, can improve the total transmittance.

2 Claims, 9 Drawing Sheets

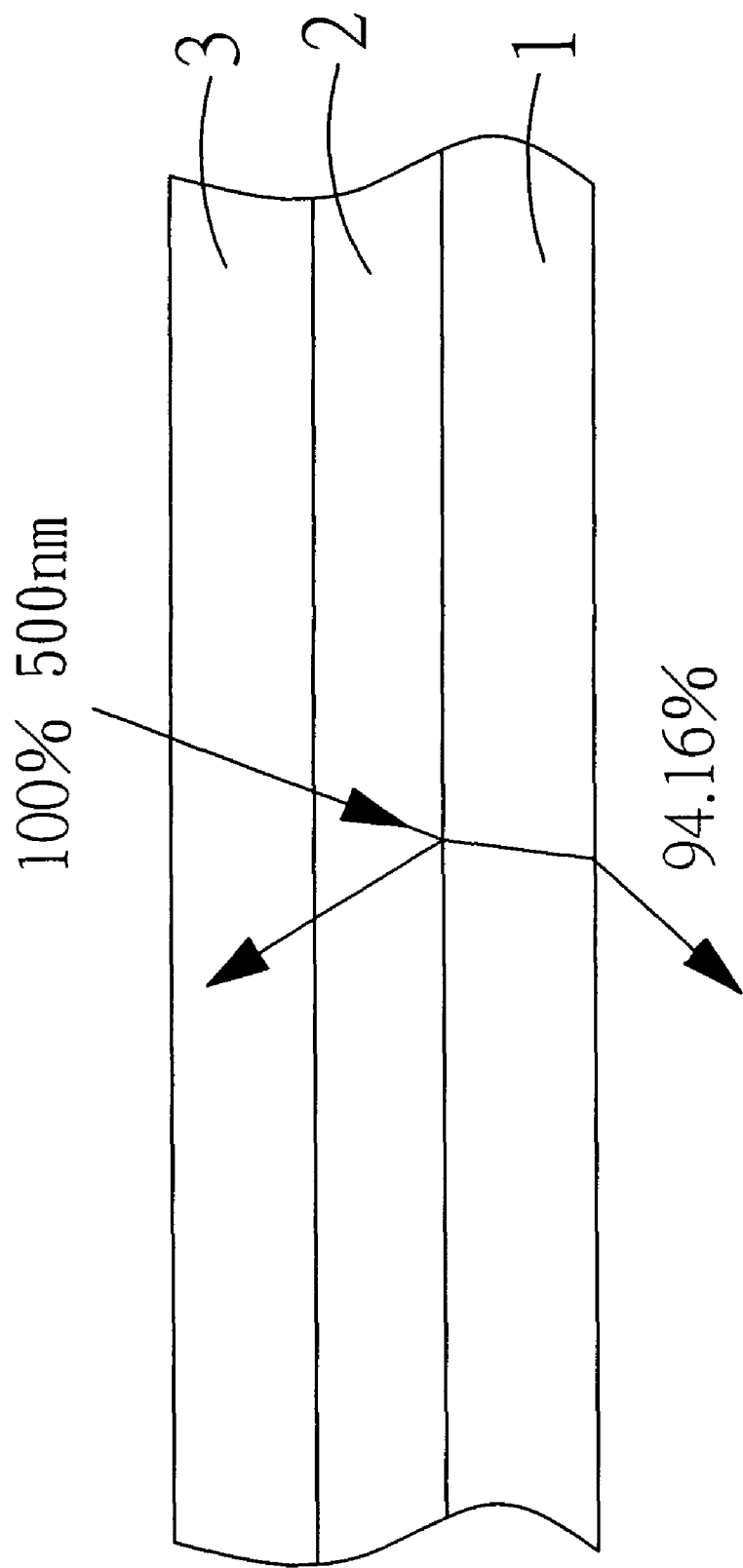

ITO LAYER STRUCTURE

BACKGROUND OF THE INVENTION (a) Field of the Invention

The present invention is related to an anti-reflection conductive coating, for plastic and/or glass substrate, whereby the structure has a high anti-reflection and/or transmittance effect. More specifically the invention is related to a layer structure which contains a transparent conductive oxide, known as Indium Tin oxide, ITO, as the outermost surface layer.

(b) Description of the Prior Art

Indium Tin Oxide (ITO) transparent conductive film is one of star products having research efforts and economic values and it is generally applied in car-laden LCD, touch panel, EMI RF shielding glass, liquid crystal wrist watch, liquid crystal panel on electric home appliance, solar cell, portable liquid crystal TV game unit, PDP, EL, LCD, and electrode for color filter.

The ITO is made by having indium oxide doped with small amount of tin oxide to have tin atoms to replace certain indium atoms existing in the structure of indium oxide. Therefore, in terms of the composition of its general structure, Indium oxide ($In_2O_3$) dominates. Indium oxide related to an oxide of semiconductor material not only presents a high band gap ($Eg \geq 2.9$ eV) for light to permeate but also contains high concentration of carriers and mobility. Of course, depending on the individual conductivity, the applied range of indium oxide varies.

Most of the applications of ITO layer structure are focus on panel or display industry products, it becomes very important to have the high transmittance property in visible light, therefore, positively searching for a good and high transmittance methods with ITO layer structure panel has been put on the top priority.

The related prior art schematically shows as FIG. 5: a transparent substrate 1, the first anti-reflected layer 2 and a transparent conductive ITO layer 3 in sequence. While some specific wavelength of visible light, such as 500 nm, transmit from the ITO layer and pass by the opposite side of substrate 1, the transmittance measured is only 94.16%. So how to improve and obtain a better transmittance of ITO layer structure is one of the most important focuses in the field of related industry.

SUMMARY OF THE INVENTION

The primary purpose of the present invention is to provide an ITO layer structure which can improve the transmittance of visible light. To achieve the purpose, an outermost layer of ITO and the first anti-reflected layer on the specific side of transparent substrate is a basic, furthermore a second anti-reflected $SiO_2$ oxide layer formed on the opposite side of substrate is added to improve the transmittance effect.

BRIEF DESCRIPTION OF THE DRAWINGS

FIG. 5 shows a prior art cross sectional view of ITO layer structure.

DETAILED DESCRIPTION OF THE PREFERRED EMBODIMENTS

To obtain clearly understanding of the present invention, please consult the detail description of the drawings and embodiments.

Figure 1:
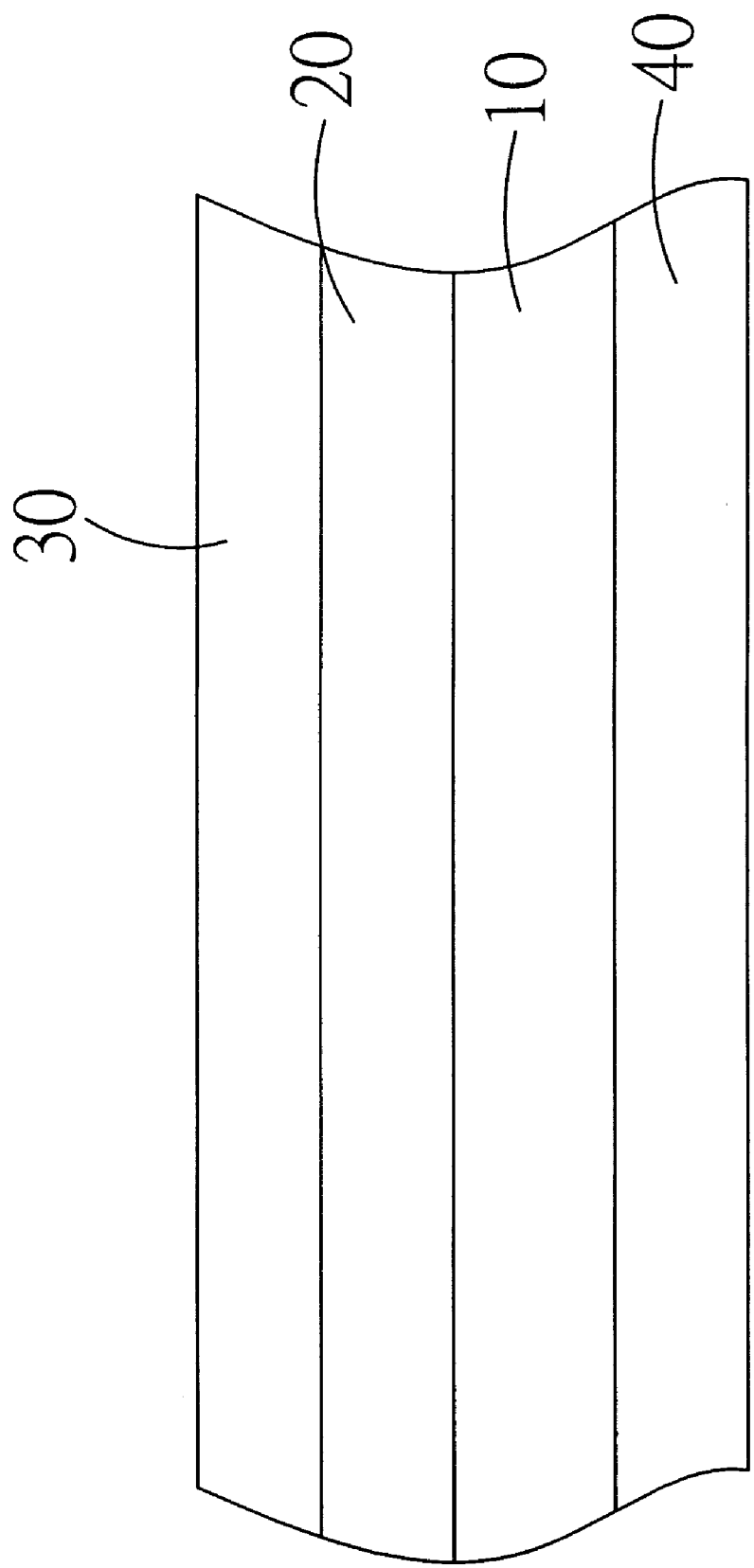
FIG. 1 shows a cross sectional view of ITO layer structure, which is associated as embodiment 1 of the present invention.

The present invention related to an ITO layer structure with high transmittance property. FIG. 1 can be taken as embodiment 1 of the present invention. An ITO layer 30 is the outermost conductive layer on the specific side of a transparent substrate 10, and a first anti-reflected layer 20 is formed between the ITO 30 and the substrate 10. Furthermore, at least a second anti-reflected layer 40 is formed on the opposite side of the substrate. Therefore, there are four layers in the structure, namely, in sequence comprising: the ITO layer 30, the first anti-reflected layer 20, the transparent substrate 10 and the second anti-reflected layer 40, wherein the second anti-reflected layer layer 40 can be processed by coating or dipping methods and the second anti-reflected layer 40 is made of $SiO_2$, which can improve the total transmittance of the ITO layer structure.

The substrate 10 may be related to a transparent glass or plastic substrate; if the transparent glass substrate is selected, a Soda Lim Glass or a Quartz Glass is preferred; and if the transparent plastic substrate is selected from the group consisted of a Polycarbonate (PC), polymethyl methacrylate (PMMA) and Polyethylene terephthalate (PET), and PC inter alia. The ITO layer 30 has a refractive index between 1.9~2.1 at a visible light wavelength of 520~550 nm and a physical thickness between 10~40 nm with a sheet resistance between 200~1500 ohm/sq.

Figure 2:
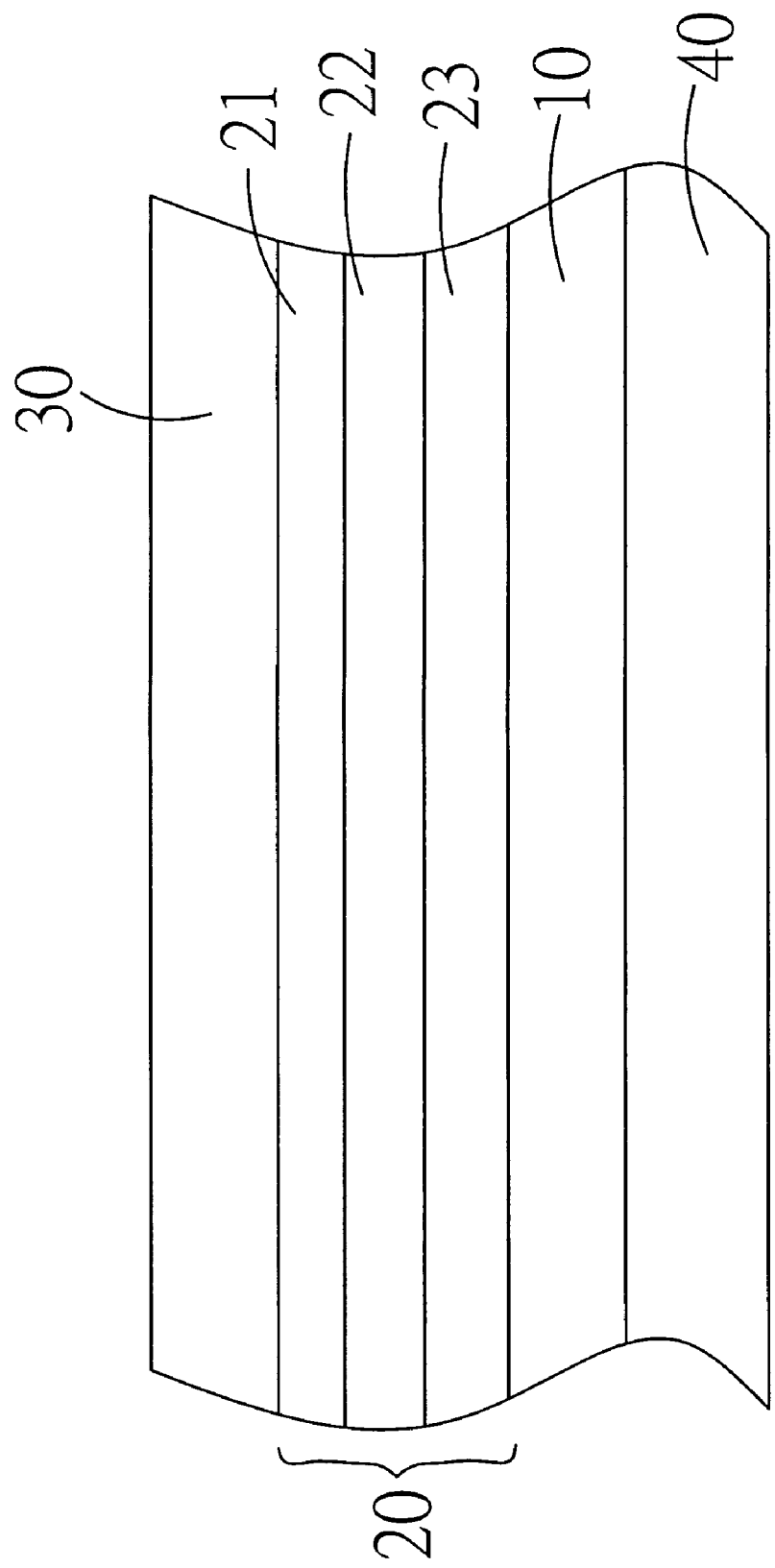
FIG. 2 shows a cross sectional view of ITO layer structure, which is associated as embodiment 2 of the present invention.

The first anti-reflected layer 20, which is formed on the substrate 10, can be performed by at least one oxide layer, showing in FIG. 2 as embodiment 2, namely in consecutive numerical order: a first oxide layer 21, a second oxide layer 22 and a third oxide layer 23, beginning from the outermost ITO layer 30. The first oxide layer 21, preferable $SiO_2$ material, has a refractive index between 1.40~1.50 at a visible light wavelength of 520~550 nm and a physical thickness between 30~60 nm; the second oxide layer 22 is selected from the group consisted of $TiO_2$, NbO and $Ta_2O_5$, has a refractive index between 2.1~2.3 at a visible light wavelength of 520~550 nm and a physical thickness between 30~80 nm; the third oxide layer 23 can be a mixture materials of $SiO_2$ and NbO, has a refractive index between 1.9~2.1 at a visible light wavelength of 520~550 nm and a physical thickness between 40~80 nm.

Figure 3:
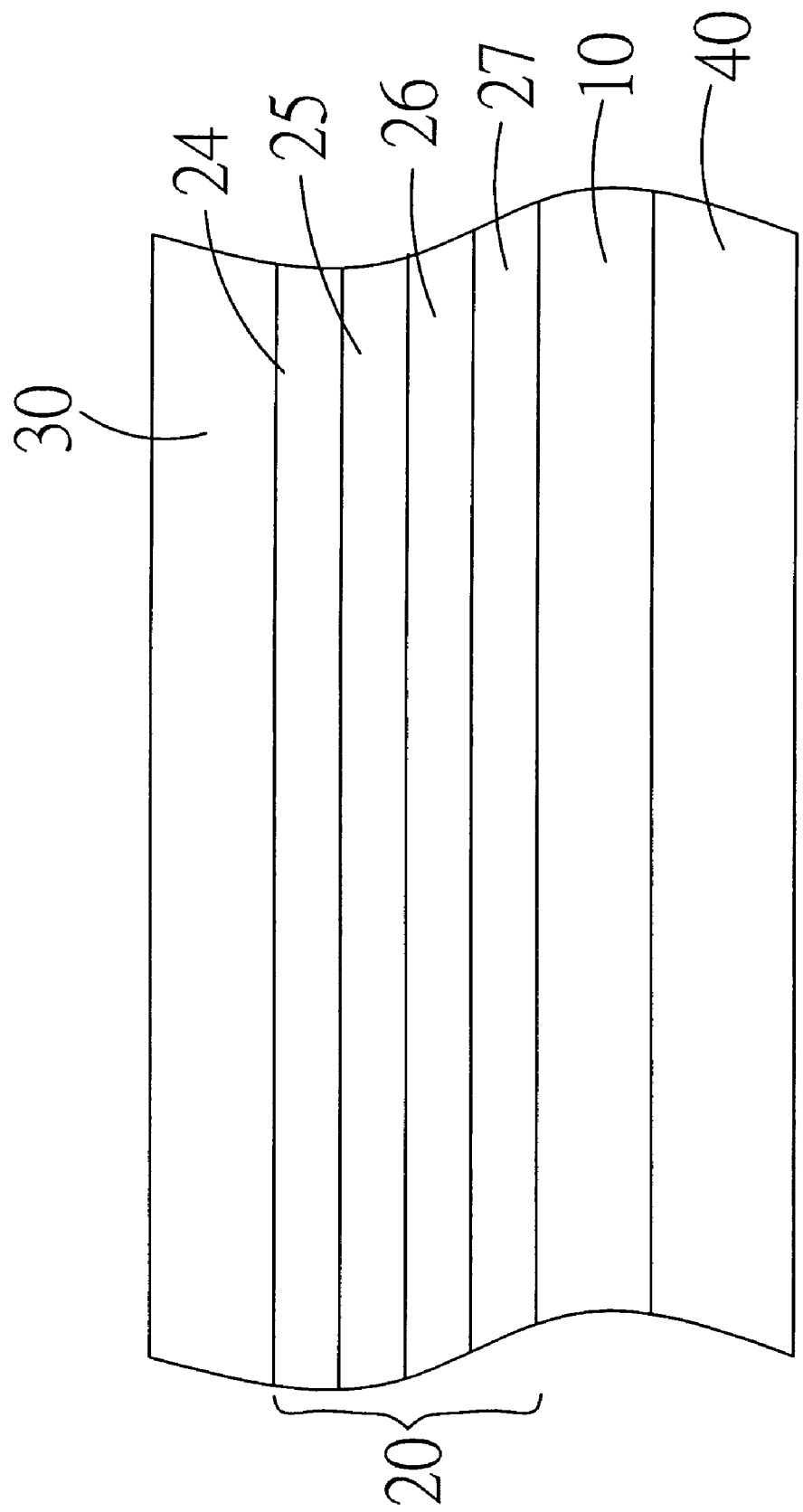
FIG. 3 shows a cross sectional view of ITO layer structure, which is associated as embodiment 3 of the present invention.

Either way can be performed showing in FIG. 3 as embodiment 3, namely in consecutive numerical order: a fourth oxide layer 24, a fifth oxide layer 25, a sixth oxide layer 26 and a seventh oxide layer 27, beginning from the outermost ITO layer 30. The fourth oxide layer 24, preferable $SiO_2$ material, has a refractive index between 1.40~1.50 at a visible light wavelength of 520~550 nm and a physical thickness between 20~60 nm; the fifth oxide layer 25 is selected from the group consisted of $TiO_2$, NbO and $Ta_2O_5$, has a refractive index between 2.1~2.3 at a visible light wavelength of 520~550 nm and a physical thickness between 40~90 nm; the sixth oxide layer 26, preferable $SiO_2$ material, has a refractive index between 1.40~1.50 at a visible light wavelength of 520~550 nm and a physical thickness between 20~60 nm; the seventh oxide layer 27 is selected from the group consisted of $TiO_2$, NbO and $Ta_2O_5$, has a refractive index between 2.1~2.3 at a visible light wavelength of 520~550 nm and a physical thickness between 10~40 nm.

Figure 4A:
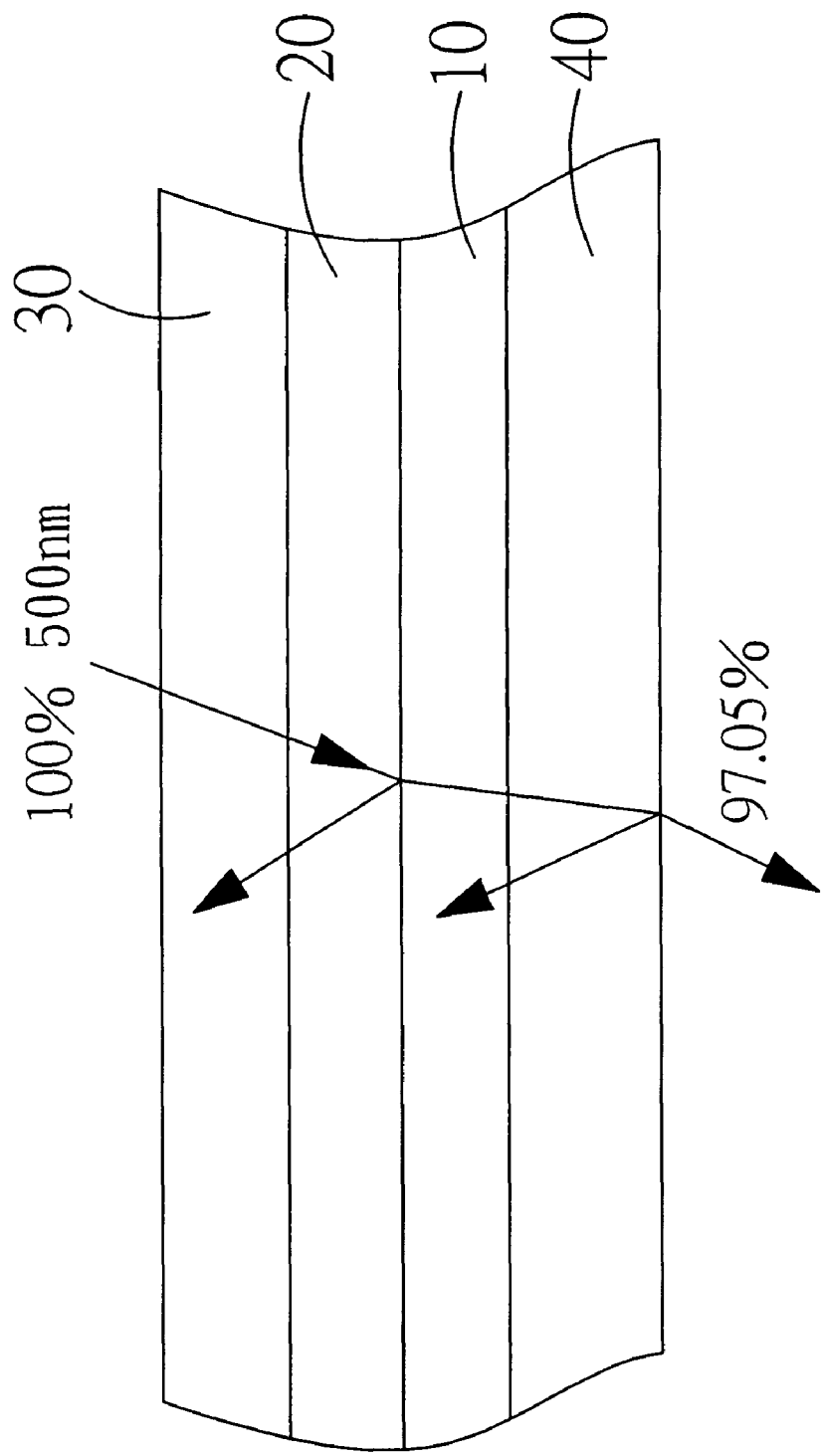
FIG. 4(A)-(B) shows a cross sectional view of ITO layer structure, which is associated as embodiment 4 of the present invention.
Figure 4B:
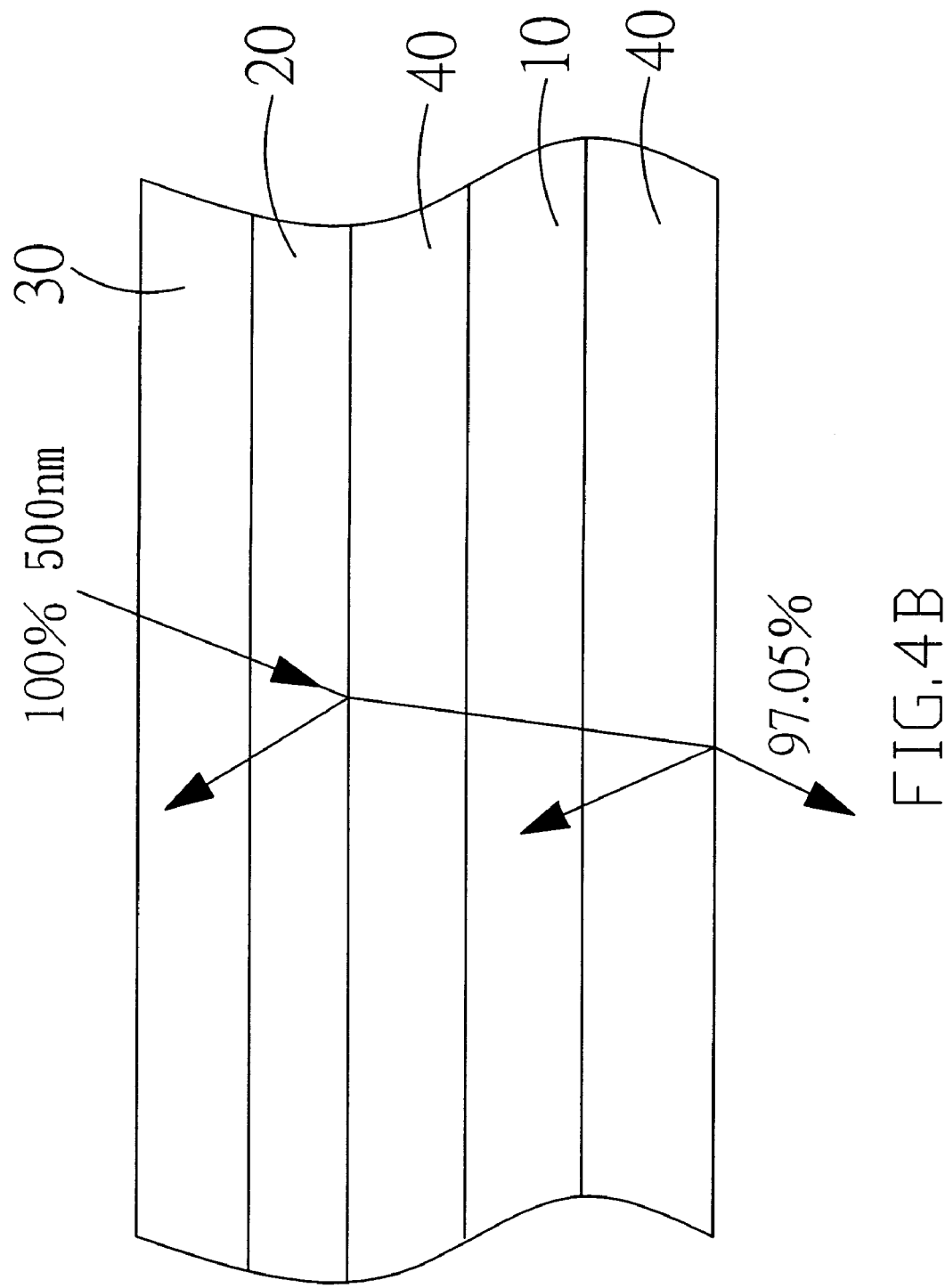

FIG. 4(A) shows as embodiment 4, the second anti-reflected layer 40 can be comprised by $SiO_2$, which is formed on the opposite side of the ITO layer 30, can obviously improve the transmittance of the ITO layer structure. The second anti-reflected layer 40 is an oxide layer, preferable a $SiO_2$ layer, has a refractive index between 1.40~1.50 at a visible light wavelength of 520~550 nm and a physical thickness between 60~120 nm. The total transmittance measured can be improved to 97.05%. To practical perform the structure, even like FIG. 4(B) showing, the second anti-reflected layer 40 of $SiO_2$ oxide can also be formed on the both sides of the substrate 10 at the same time, thereby, on the ITO side there can be fined the second anti-reflected layer 40 between the first anti-reflected layer 20 and the substrate 10.

Figure 6:
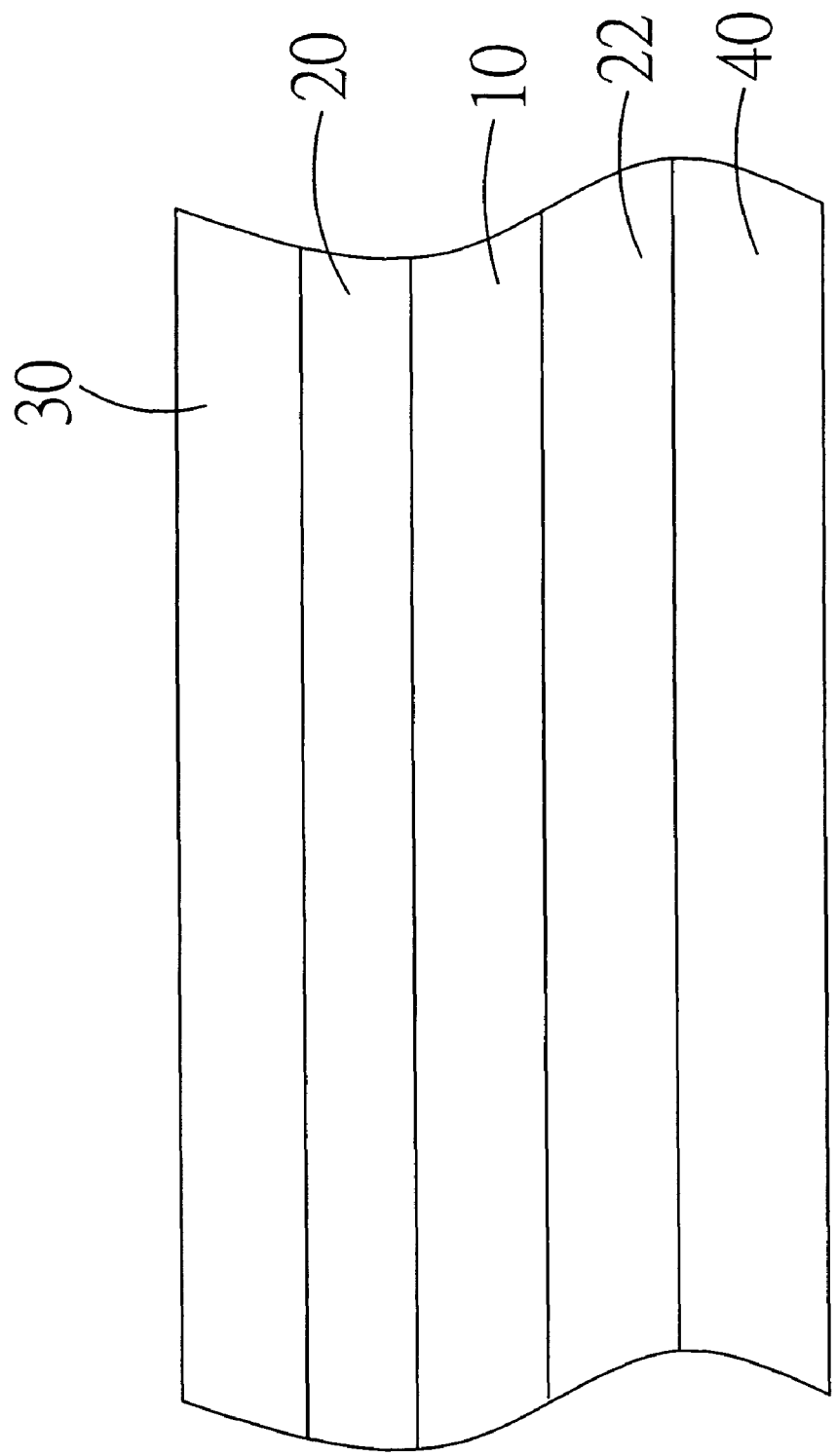
FIG. 6 shows a cross sectional view of ITO layer structure, which is associated as embodiment 5 of the present invention.
Figure 7:
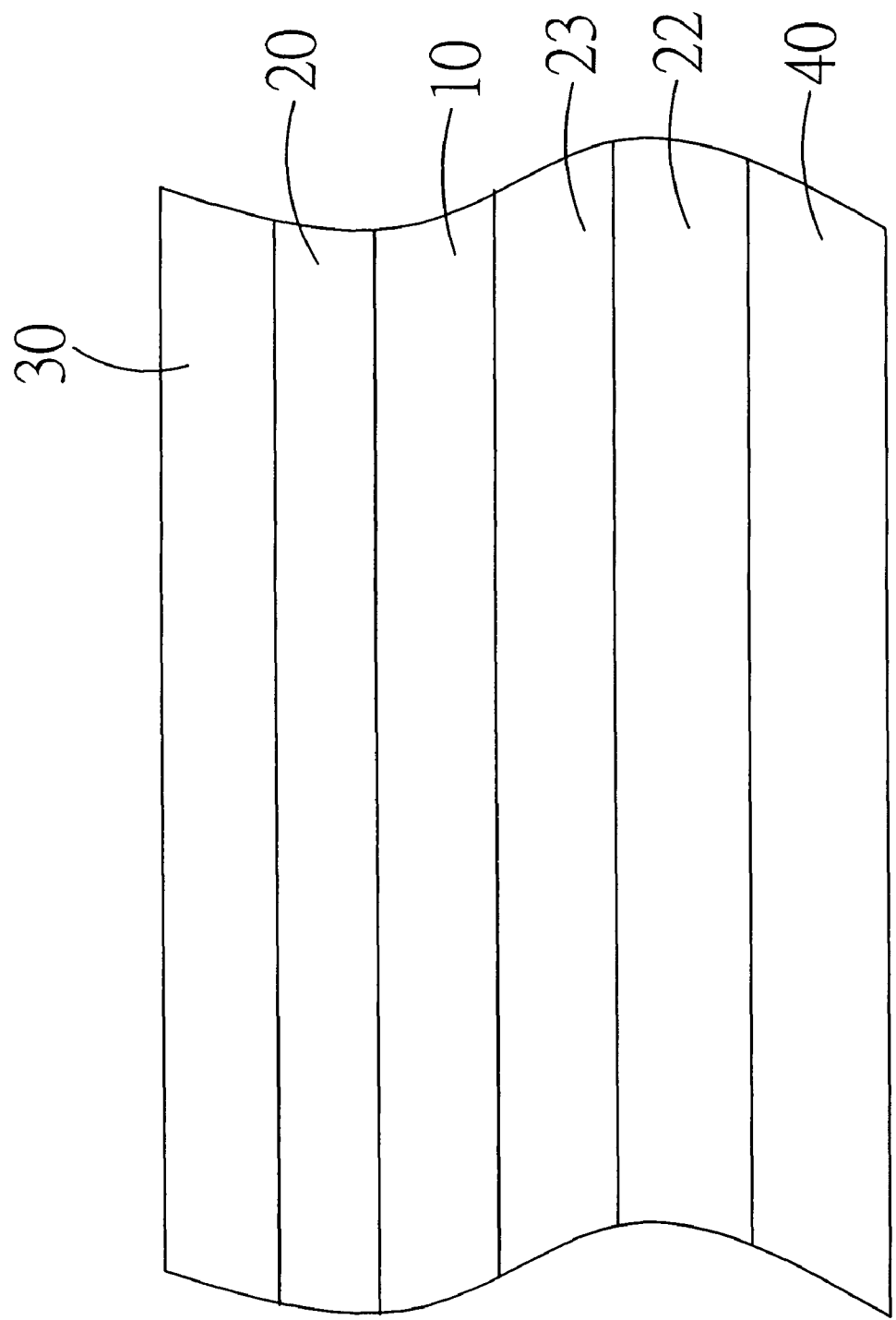
FIG. 7 shows a cross sectional view of ITO layer structure, which is associated as embodiment 6 of the present invention.
Figure 8:
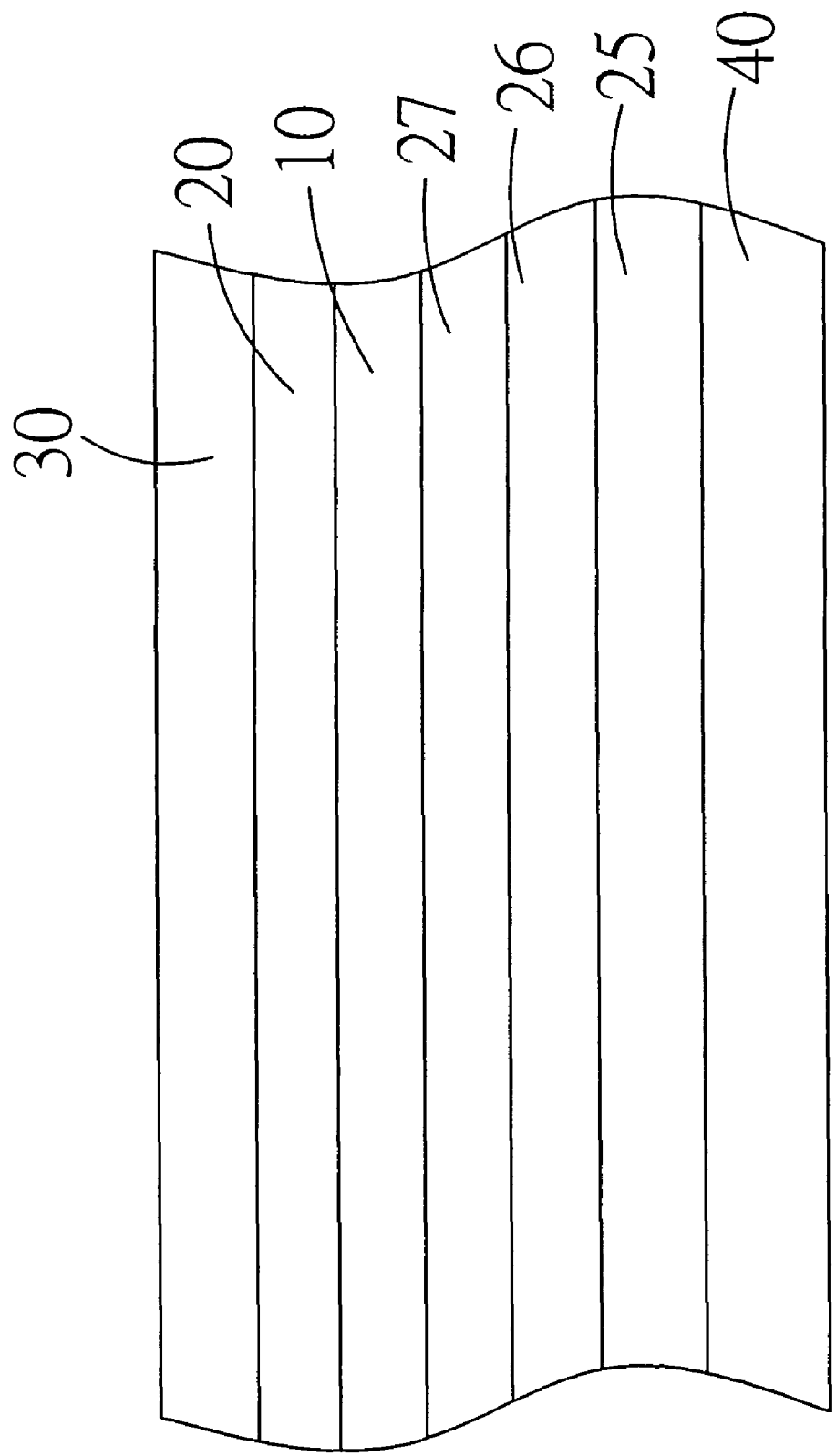
FIG. 8 shows a cross sectional view of ITO layer structure, which is associated as embodiment 7 of the present invention.

Of course, some oxide layers can also be formed between the substrate 10 and the second anti-reflected layer 40. FIG. 6 shows the ITO layer structure of embodiment 5, namely in sequence, comprising: the ITO layer 30, the first anti-reflected layer 20, the substrate 10, the second oxide layer 22 and the second ant-reflected layer 40 with a physical thickness between 20~60 nm. FIG. 7 shows the ITO layer structure of embodiment 6, namely in sequence, comprising: the ITO layer 30, the first anti-reflected layer 20, the substrate 10, the third oxide layer 23, the second oxide layer 22 and the second ant-reflected layer 40 with a physical thickness between 20~60 nm. After the test, the total transmittance measured can be improved to above 97.05%. Furthermore, the ITO layer structure can be applied into a touch panel display monitor.

However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:
1. An ITO layer structure in sequence comprising:
an ITO layer;
a first anti-reflected layer;
a transparent substrate; and
a second anti-reflected layer,
   wherein the first anti-reflected layer in sequence comprising:
      a first oxide layer is made of $SiO_2$ and has a refractive index between 1.40~1.50 at a visible light wavelength of 520~550 nm and a physical thickness between 30~60 nm;
      a second oxide layer is selected from the group consisted of $TiO_2$ NbO and $Ta_2O_5$ and has a refractive index between 2.1~2.3 at a visible light wavelength of 520~550 nm and a physical thickness between 30~80 nm; and
   a third oxide layer is a mixture material of $SiO_2$ and NbO and has a refractive index between 1.9~2.1 at a visible light wavelength of 520~550 nm and a physical thickness between 40~80 nm.
2. An ITO layer structure in sequence comprising:
an ITO layer;
a first anti-reflected layer;
a transparent substrate;
a second anti-reflected layer;
a second oxide layer is formed between the second anti-reflected layer and the substrate, wherein the second oxide layer is selected from the group consisted of $TiO_2$, NbO and $Ta_2O_5$ and has a refractive index between 2.1~2.3 at a visible light wavelength of 520~550 nm and a physical thickness between 30~80 nm; and
a third oxide layer is formed between the second oxide layer and the substrate, wherein the third oxide layer is a mixture material of $SiO_2$ and NbO and has a refractive index between 1.9~2.1 at a visible light wavelength of 520~550 nm and a physical thickness between 40~80 nm.

* * * * *